United States Patent
Chon et al.

(10) Patent No.: US 6,821,453 B2
(45) Date of Patent: Nov. 23, 2004

(54) ENVIRONMENTALLY SAFE AND LOW CORROSIVE DE-ICERS AND A METHOD OF MANUFACTURING SAME

(75) Inventors: Jung Kyoon Chon, Kyunggi-do (KR); Won Seouk Chae, Kyunggi-do (KR); Jin Wan Jeong, Kimpo-si (KR); Jong Sam Park, Seoul (KR)

(73) Assignee: Bae Kyoon Kim, Gyeonggi-do (KR)

( * ) Notice: Subject to any disclaimer, the term of this patent is extended or adjusted under 35 U.S.C. 154(b) by 485 days.

(21) Appl. No.: 10/144,385

(22) Filed: Oct. 25, 2001

(65) Prior Publication Data

US 2003/0071241 A1 Apr. 17, 2003

(30) Foreign Application Priority Data

Mar. 2, 2001 (KR) ........................................ 2001-10857

(51) Int. Cl.⁷ ................................................. C09K 3/18
(52) U.S. Cl. .......................................... 252/70; 106/13
(58) Field of Search ............................... 252/70; 106/13

(56) References Cited

U.S. PATENT DOCUMENTS

| | | | |
|---|---|---|---|
| 5,275,752 A | 1/1994 | Hansen | 252/70 |
| 5,366,650 A | 11/1994 | Wiesenfeld et al. | 252/70 |
| 5,482,639 A | 1/1996 | Archer et al. | 252/70 |
| 5,645,755 A | 7/1997 | Wiesenfeld et al. | 252/70 |
| 5,683,619 A | 11/1997 | Ossian et al. | 252/70 |
| 5,718,836 A * | 2/1998 | Nakatani et al. | 252/74 |
| 5,840,207 A | 11/1998 | Beazley et al. | 252/70 |
| 5,851,418 A | 12/1998 | Moore | 252/70 |
| 5,935,487 A | 8/1999 | Beazley et al. | 252/70 |
| 6,039,890 A | 3/2000 | Ossian et al. | 252/70 |

FOREIGN PATENT DOCUMENTS

| | | | | |
|---|---|---|---|---|
| EP | 000494506 A1 * | 7/1992 | | C09K/3/18 |
| KR | 0219190 | 6/1999 | | |

* cited by examiner

Primary Examiner—Anthony J Green
(74) Attorney, Agent, or Firm—Jones Day

(57) ABSTRACT

The present invention relates to environmentally safe low corrosive de-icers and the manufacturing method thereof, and more particularly, to environmentally safe low corrosive de-icers and the manufacturing method thereof, wherein said de-icers comprise calcium chloride ($CaCl_2 \cdot 2H_2O$) as an active ingredient, along with a food stabilizer and a vegetable calcium as additives for anti-corrosion and a soil property improver as an ice-melting promoter thus having a much improved anti-corrosion property for metal such as steel structure as compared to conventional low de-icers, enabling to eliminate the danger of environmental contamination by using ingredients environmentally safe to plants and soils, and also enabling to mix the ingredients of the composition more uniformly during manufacture while retaining the essential property of fast solubility as a de-icer by introducing a system which can optimize temperature, mixing ratio, mixing speed and duration of mixing.

7 Claims, 3 Drawing Sheets

ENVIRONMENTALLY SAFE AND LOW CORROSIVE DE-ICERS AND A METHOD OF MANUFACTURING SAME

FIELD OF THE INVENTION

The present invention relates to environmentally safe and low corrosive de-icers and a method of manufacturing same. According to the present invention, the de-icers comprise calcium chloride ($CaCl_2 \cdot 2H_2O$) as an active ingredient, a stabilizer (such as those used in foods) and a vegetable calcium preparation as additives for anti-corrosion, and a soil property improver as an ice-melting accelerator. Therefore, the present invention provides the de-icers having much improved anti-corrosion properties for metals such as steel structures as compared to conventional low corrosive de-icers, enabling to eliminate harmful damage to environment by using ingredients known as environmentally safe to plants and soils, and also enabling to mix the ingredients of the compositions more uniformly during manufacturing process, while still retaining the essential property of fast dissolution as a de-icer by introducing a system to optimize conditions such as temperature, mixing ratio, mixing speed and duration of mixing.

BACKGROUND OF THE INVENTION

Calcium chloride and salt (rock salt) are most commonly used as de-icers during the winter season. They have advantages in that they are inexpensive, exhibit superior initial ice-melt activity due to the heat generated during their dissolution, and also prevent them from being refrozen by lowering their freezing point, however, they also have a disadvantage that they can corrode metal parts of a bridge due to their highly corrosive nature as described in the following table 1.

TABLE 1

Most frequently used De-icers

| De-icer | | Advantages | Disadvantages |
|---|---|---|---|
| Absorbent salt | Calcium chloride Magnesium chloride | Excellent Reduction of Freezing point | More expensive than rock salt Occurrence of skidding |
| Chemical Fertilizer | Calcium chloride Urea | Environment-friendly Plant Protection | Insufficient Deicing Effect |
| Rock salt | | Cheap | Harmful to plants when used in excess Insufficient Deicing effect |
| Antiskid agent | Sand Ash Diatom | | Insoluble Inappropriate ice penetration for antiskid |

Therefore, studies have been focused on developing organic salts of non-chlorine type de-icers but they do not appear to be applicable because they are rather expensive and also not sufficient with respect to the initial ice-melt activity. Korea Pat. No. 99-219190 discloses a low corrosive ice-melting composition comprising salt or calcium chloride as an active ingredient and many similar U.S. patent applications have been filed since 1994.

The following table 2 shows registered patents which employ the addition of an anticorrosive agent or an ice-melt accelerator to the conventional de-icers which contain salt or calcium chloride as an active ingredient. The anticorrosive agents used in the patents of the following table 2 are shown to inhibit the corrosion of metals by protecting their surface via adsorption while ice-melt accelerator are used along with de-icers to expedite the deicing speed by activating the interface of ice by using a heat generating compound or a de-icer. However, the conventional low corrosive de-icers contain excessive amount of additives to prevent corrosion and thus there exists a great danger that they may damage the environment and it is noted that there is also a patent that uses phosphate type salt which is prohibited to use in several states of U.S.

U.S. Pat. Nos. 5,482,639 and 5,683,619 disclose additives used in manufacturing low corrosive de-icers and the process of manufacturing the same. Most of the patents shown in the following table 2 are concerned with the additives which are used to reduce the corrosiveness of the conventional de-icers. However, it should be noted that the process of manufacturing a low corrosive de-icer plays a crucial role in retaining and maintaining the essential properties of a de-icer required during the addition and mixing of additives.

TABLE 2

Patents related to Low corrosive De-icers

| Pat. No. | Subject Matter | Additives |
|---|---|---|
| *6,039,890 | Increase of melt speed by the addition of surfactant | Cation/anion and non-ionic surfactants |
| *5,935,487 | Calcium chloride with a corrosion inhibitor | Diethanolamide |
| **10-0219190 | Calcium chloride with a corrosion inhibitor | calcium nitrite with a nitrite formates heterocyclic or aromatic ring, etc. sodium chloride, calcium chloride, potassium chloride, ammonium chloride, magnesium chloride, sodium sulfate, magnesium sulfate, ammonium sulfate, ammonium acetate, calcium acetate, potassium acetate, sodium acetate, magnesium acetate, etc. phosphates such as sodium phosphate, ammonium phosphate, calcium phosphate; and nitrites such as sodium nitrite, ammonium nitrite, calcium nitrite, etc. silicates such as sodium silicate and potassium silicate chromates such as potassium dichromate and sodium dichromate organic carboxylates water-soluble organic amines surfactants: anionic or non-ionic heterocyclic compounds: pyrrole, imidazole, indazole, 1H-indazole, benzofuran, benzotriazole, quinoline, quinazoline, etc. water-soluble polymers: non-ionic, cationic, anionic, and amphoteric graphite powder dyes and pigments: cobalt blue, cobalt violet, phenolphthalein, p-nitrophenol, methyl violet, thymolphthalein, natramine, etc. methanol, ethanol, |

TABLE 2-continued

Patents related to Low corrosive De-icers

| Pat. No. | Subject Matter | Additives | |
|---|---|---|---|
| | | n-propanol, isopropylalcohol, etc. | |
| | | low aliphatic monovalent alcohol or ethylene glycol, diethylene glycol, propylene glycol, etc. | |
| | | low aliphatic divalent alcohol, etc. | |
| *5,851,418 | Oxygen scavenger, De-icer with corrosion inhibitor | Sodium nitrate Sodium borate Ammonium phosphate | |
| *5,840,207 | Calcium chloride with a corrosion inhibitor | Diethanolamide Phthalic anhydride | |
| *5,683,619 | Vegetation-friendly ice-melting composition added with a chemical fertilizer and method the making the same | Urea | |
| *5,645,755 | Alkaline, non-phosphate, ice-melter composition | Thiourea, aromatic and alkyl amines, quarternaries, fatty acid epoxylates and the derivatives | Sulfur-containing compounds, acelyenic alcohol derivatives, hetero aromatic compounds and their miscellaneous compounds |
| *5,482,639 | De-icer with corrosion inhibitor and its manufacturing method | α-methyl glucoside Urea | |
| *5,275,752 | De-icer with a corrosion inhibitor | Ammonium caramate | |
| *5,366,650 | De-icer with a corrosion inhibitor (pH < 7) | 2 butene-1,4-diol | |

(*U.S. Pat. No. ; ** Korean Pat.)

The de-icers shown in the above table 2 can be divided into two different groups of inventions; inventions which include the use of all the compounds that prevent corrosion and inventions which reduce the corrosion by using the intrinsic properties of selected compounds. However, compounds that prevent corrosion have been described in numerous reports and many of them are compounds that are prohibited to be used in most states of U.S. because of their harmfulness to the environment. Therefore, it is in urgent need to develop a de-icer and its manufacturing method which has an excellent anti-corrosion activity as well as an excellent ice-melt activity while not being harmful to plants or soils.

SUMMARY OF THE INVENTION

To resolve the above-mentioned problems, the inventors of the present invention conducted their studies on the development of de-icers which are much less corrosive to metals than the conventional ones by using compounds of harmless food additives; are colored for easier identification of the amount of sprayed de-icers as well as their presence, and have fast rate of dissolution during ice-melt. For these purposes, anticorrosive compounds selected from the group consisting of known harmless food additives, calcium preparations for fruit trees, soil property improvers, and calcareous fertilizers were introduced to reduce corrosive properties of de-icers; colors were introduced by using the color change indicators based on the acid/base property as compared to the conventional white de-icers. Further, considering the importance of the mixing conditions of additives and color formers, which can result in change in shapes of de-icers and affect the melting activity, the inventors of the present invention set up mixing conditions optimal for manufacturing de-icers and finally completed the present invention.

Therefore, the object of the present invention is to provide excellent de-icers which are environment-friendly as well as low corrosive thus enabling to secure the safety of steel structures.

DETAILED DESCRIPTION OF THE PREFERRED EMBODIMENTS

Figure 1:
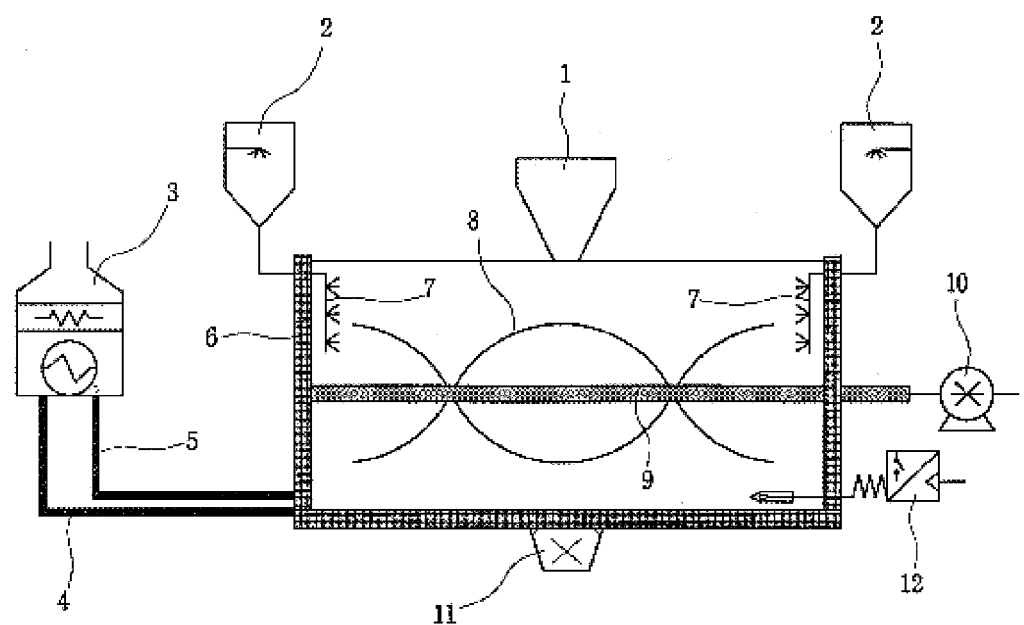
FIG. 1 is a schematic view showing the structure of a mixer used in manufacturing low corrosive de-icers according to the present invention.

The present invention relates to de-icing composition comprising calcium chloride as an active ingredient and calcium formate, a color change indicator and other additives as non-active ingredients characterized in that said deicing composition is an environmentally safe low corrosive deicing composition comprising 92–99.5 wt % of calcium chloride ($CaCl_2.2H_2O$), 0.5–5 wt % of sodium benzoate, 0.01–2 wt % of calcium formate, 0.01–1 wt % of calcium hydroxide and 0.0001–0.0003 wt % of a color change indicator. The present invention is also characterized in that the ingredients of the above de-icer composition are mixed in a mixer by using a revolving screw kept at 60–90° C.

The present invention is described in detail as described hereunder.

The present invention is added with various additives; i) additives sodium which are harmless to environment such as benzoate (food stabilizer) and calcium formate (calcium for a fruit tree) are used to reduce the corrosive property of the conventional de-icers; ii) soil property improvers or calcium hydroxide calcareous fertilizers are used to improve functionality and melt speed of de-icers, and iii) color change indicators are used to identify the amount as well as the presence of de-icers already sprayed. Further, the present invention also employs the adjustment of temperature and mixing speed to improve the functionality of the de-icers being manufactured.

The invention is explained in more detail according to the ingredients of the de-icers as set forth hereunder.

The de-icers of the present invention contain 92–99.5 wt % of calcium chloride as an active ingredient, the most well-known conventional de-icer component. In addition, the present invention also contains sodium benzoate, calcium formate and calcium hydroxide as non-active ingredients within the range of 0.5–8 wt %.

The above sodium benzoate is a preservative for food and therefore the use of sodium benzoate in excess will not be harmful to environment (the standard use for food is less than 0.6 g/kg), however, it can lead to increase in chemical oxygen demand (COD) and thus it is preferred to be used in the range of 0.5–5 wt %.

The above calcium formate is used as a calcium preparation for fruit trees; in fact, it is better for a given plant to have more amount of calcium for the calcium formate.

The above calcium hydroxide is usually used as a soil property improver or a calcareous fertilizer and thus use of great amount of calcium hydroxide will be beneficiary from the environmental point of view, however, it can raise a problem in decolorization of a color change indicator and thus preferred to use in the range of 0.01–1 wt %. This color change indicator gives a color to de-icers. Examples of color change indicators are phenolphthalein tymol blue and the like, and 0.0001–0.0003 wt % of phenolphthalein is used in the present invention. Phenolphthalein performs the functions of ice-melt acceleration and anti-corrosion, and it takes on a reddish color in alkaline solution while it dos not form any color in acidic solution. The de-icer compositions of the present invention are basic prior to dissolution because they contain small amount of calcium hydroxide and thus take on a reddish color by phenolphthalein. Therefore, the presence and the amount of the de-icer can be easily identified when sprayed during snowfall. The de-icers of the present invention do not generate any color because they become acidic during the melting period of snow and thus remaining de-icers will not raise any color problem.

Other additional ingredients of the de-icer compositions of the present invention include water and methanol which are used in uniform mixing and coloration but they are evaporated during manufacturing process and there will be only trace amount left eventually. The preferred mixing ratio between water and methanol is 1:1–3:1 (v/v).

After adding solid ingredients and liquid ingredients to calcium chloride in the present invention, the mixture is then uniformly mixed by using a thermal exchange type mixer with a revolving screw as shown in FIG. 1 and the temperature and the amount of liquid play crucial roles in determining the final shapes of de-icers.

The above mixer comprises an inlet 1 for calcium chloride and non-active solid ingredients; an inlet 2 for a mixture of water, methanol and a color change indicator; a boiler 3 that maintains the temperature of a mixer at 60–90° C.; a pipe 4 to transfer warm water from the boiler 3 to the external surface of the mixer; a pipe 5 that connects the cooled water from the external surface of the mixer to the boiler 3; a double-jacketed circulating system 6 for warm water; a sprayer 7 that helps to well mix between additives and calcium chloride; a revolving screw 8 that helps to well mix between additives and calcium chloride; a shaft 9 that transmits driving force from an electric motor 10 to the revolving screw 8; an electric motor 10 that rotates the revolving screw 8 of the mixer; an outlet 11 for a mixture between calcium chloride and non-active ingredients; and a temperature sensor and temperature control device 12.

For the uniform mixing of solid ingredients such as sodium benzoate, calcium formate and slaked lime and the liquid ingredients such as water, methanol and a color change indicator as well as for the maintenance of uniform shape of calcium chloride, the mixer should be kept at 60–90° C. so that liquid ingredients can be evaporated before the solid calcium chloride is melted and at the same time they should be uniformly mixed by the revolution of the screw 8 and the screw shaft 9. The purpose of keeping the internal temperature of a mixer at a high temperature is to remove water content in the de-icer and this is ascribed to the fact that initial snow-melt effect is reduced by the presence of water in the de-icers.

The speed of revolution of the revolving screw is preferred to be 25–30 rpm and the above liquid ingredients are added 3–5 parts by wt per 100 parts by wt of the above solid ingredients. The mixture is preferred to spray by using a sprayer at the rate of 0.2–1 parts by wt/min.

Thus manufactured environment-friendly low corrosive de-icer compositions of the present invention are more advantageous as compared to those of conventional de-icer compositions in that they can substantially reduce the rate of steel corrosion by 5 times, minimize the level of corrosion, their initial snow-melt effect is equivalent to or better than those of conventional ones, and can reinforce the strength of a given cement concrete due to the presence of calcium in the composition, and this is because the elution of calcium ions are prevented by so-called 'common ion effect'.

The invention is explained in more detail based on the following examples by means of its preferred form with a certain degree of particularity, however, it is appreciated by those skilled in the art that the present disclosure of the preferred form has been made only by way of examples and that numerous changes in the details of the construction, combination, and arrangement of parts may be resorted to without departing from the spirit and scope of the invention.

EXAMPLE

To the inlet 1 of a mixer were added with 300 kg of calcium chloride ($CaCl_2.2H_2O$), and solid ingredients of 6 kg of sodium benzoate, 3 kg of calcium formate, and 0.3 kg of calcium hydroxide and then uniformly mixed by the revolution of the screw 8 and the screw shaft 9 driven by an electric motor 10. The internal temperature of a mixer was kept at 80° C. by using a boiler system (3, 4, 5 and 6) and then the mixture containing water and methanol (1:1) (v/v) and about 10 ppm of a color change indicator was sprayed by using a sprayer 7 to uniformly mix the calcium chloride and the non-active ingredients. Ten liters of the mixture was sprayed by the rate of 2 L/min and was mixed for 1.5 hr at 80° C. by using the temperature control device 12 until the mixture was formed into granules.

Experimental Example (1) Dipping Method

Figure 2:
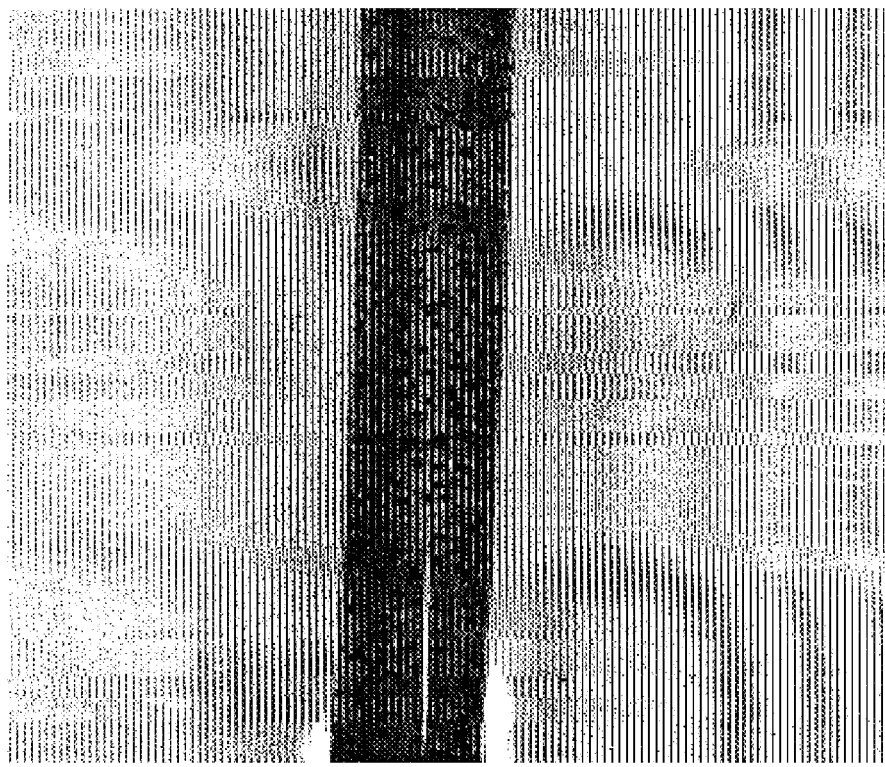
FIG. 2 is a picture showing the level of corrosion of a steel nail dipped in a conventional de-icer solution.
Figure 3:
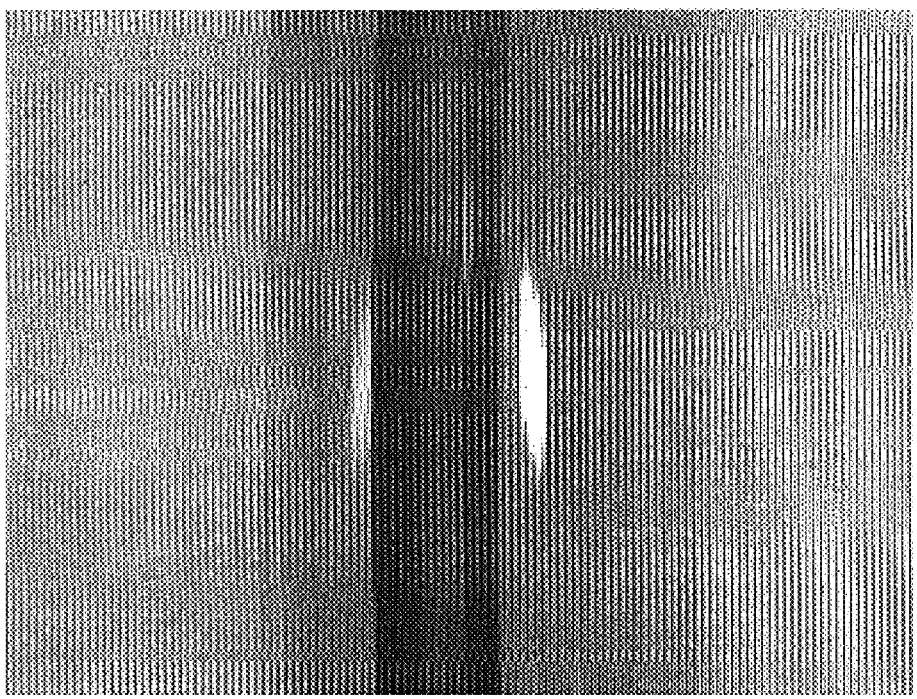
FIG. 3 is a picture showing the level of corrosion of a steel nail dipped in an environment-friendly low corrosive de-icer solution manufactured according to the present invention.

Steel nails were dipped into each 5 wt % solution of the conventional calcium chloride de-icer and the de-icer of the present invention (example) for 7 days, respectively, and then photographed (FIGS. 2 and 3). The result revealed that the steel nail dipped in the de-icer solution of the present invention (FIG. 3) did not show the presence of oxidized iron around the steel nail while the steel nail (FIG. 2) of the conventional dipped in the conventional de-icer solution showed the heavy presence of oxidized iron around the steel nail.

(2) Electrochemical Test Method of Corrosion

The process of corrosion is an electrochemical phenomenon and thus the electrochemical test of corrosion is the most fundamental and important step in studying corrosion. In the present invention, the corrosion currents at corrosion potential were measured by using the steel nails for concrete as specimens and their corrosion rates were compared. The result showed that the corrosion rate of the de-icers of the present invention were greatly reduced as compared to those of conventional de-icers.

Figure 4:
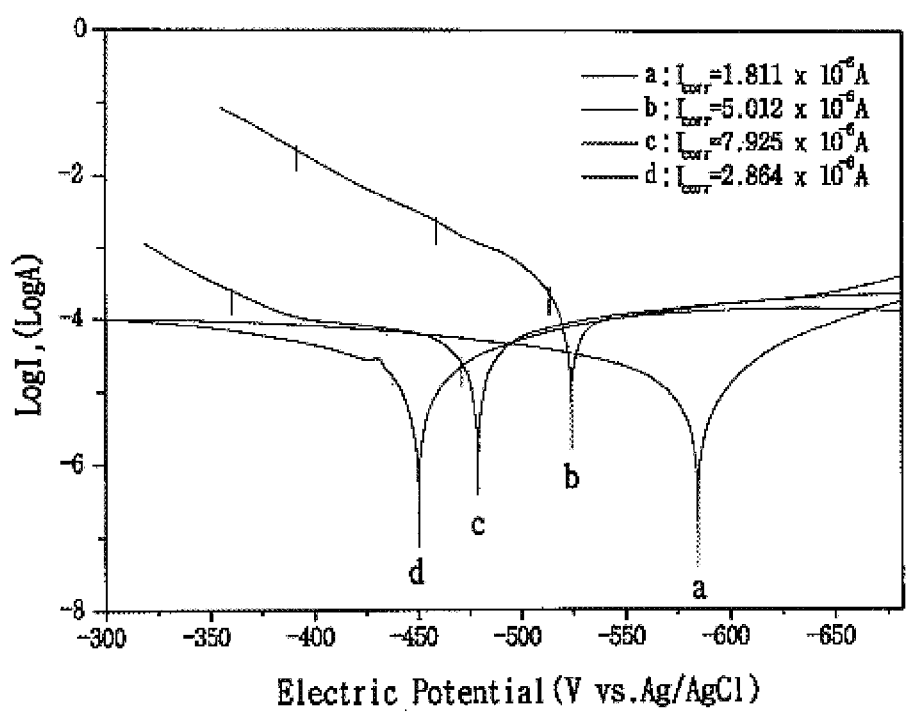
FIG. 4 is a graph showing the result of electrochemical test of corrosion of steel performed in various kinds of decier solutions.

FIG. 4 is a graph that shows the result of electrochemical measurements of corrosion of steels performed at various de-icer solutions. Here, (a) represents a low corrosive de-icer (ALCAO, KSRI Co., Ltd., Korea); (b) represents a conventional calcium chloride de-icer; (c) represents the de-icer of the rpesent invention; and (d) represents a non-chlorine low corrosive de-icer (Korea Highway Corporation). The corrosion current at each corrosion potential was measured as the result of the oxidation reaction of steels and the level of corrosion current is used in estimating the corrosion rate of steels.

Figure 5:
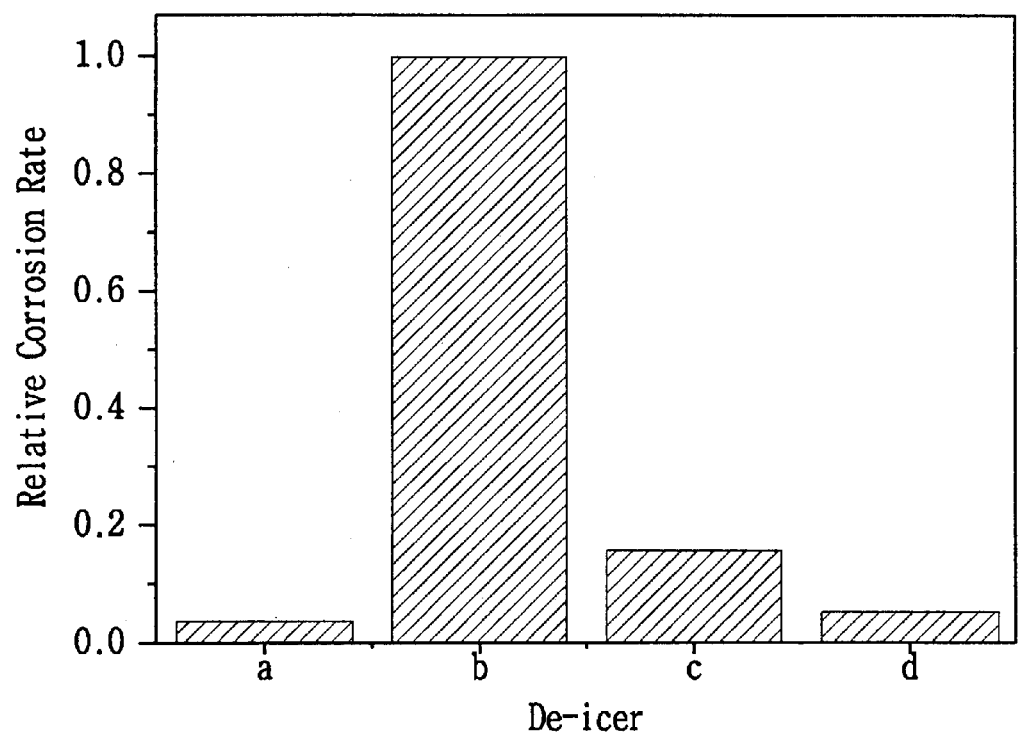
FIG. 5 is a graph showing the relative corrosion rate of steel performed in various kinds of decier solutions.

FIG. 5 is a graph that shows relative corrosion rates according to different corrosion currents measured in FIG. 4. The result shows that the low corrosive de-icers, as compared to the convention chlorine de-icer (b), had remarkably lower corrosion rates. The corrosion rate of steels measured in the solution (c) of example was lower than the solution in the conventional chlorine de-icer (b) by 5 times, whereas the corrosion rate of steels measured in the solution (a) of de-icer containing slaked lime was lower than the solution in the conventional non-chlorine de-icer (d) by 10 times.

The conventional low corrosive de-icers are largely grouped into non-chlorine type and alkaline type de-icers, and the above (d) belongs to the non-chlorine type while the above (a) belongs to alkaline type de-icer.

Non-chlorine type de-icers contain calcium formate as an active ingredient and they are not advantageous in that their initial ice-melt effect is not only insufficient but also very expensive. Moreover, alkaline type de-icers contain organic compounds and thus require high biological oxygen demand (BOD) as well as high chemical oxygen demand (COD). The above (a) contains oxidized calcium as an active ingredient and it can cause a drain problem in a rainy season because the above (a) sprayed during snowfall melts snow and is converted into calcium hydroxide which remains on roads undissolved thereby clogging the drain passage.

As described in the above, the de-icer compositions of the present invention have many advantages in that they can greatly reduce the corrosive properties of the conventional de-icers thus securing the safety of steel structures; they are environment-friendly products by using additives such as food preservatives, calcium preparations for fruit trees, soil property improvers, calcareous fertilizers, and the like, which are also beneficiary to plants, and are therefore expected to contribute to greatly increase the safety of steel structures of highways, steel bridges, and the like.

What is claimed is:

1. An environmentally safe and low corrosive de-icing composition comprising about 92–99.5 wt % of calcium chloride ($CaCl_2 \cdot 2H_2O$), about 0.5–5 wt % of sodium benzoate, about 0.01–2 wt % of calcium formate, about 0.01–1 wt % of calcium hydroxide, and about 0.0001–0.0003 wt % of a color change indicator.

2. The de-icing composition of claim 1, wherein the color change indicator is phenolphthalein tymol blue.

3. A method of manufacturing the de-icing composition of claim 1, the method which comprises mixing solid ingredients of sodium benzoate, calcium formate and calcium hydroxide and liquid ingredient of the color change indicator with calcium chloride in a mixer kept at 60–90° C. by using a revolving screw.

4. The method of claim 3, wherein the speed of said revolving screw is 25–30 rpm.

5. The method of claim 3, wherein a mixture comprises about 3–5 parts by weight of said liquid ingredient to 100 parts by weight of said solid ingredients, wherein said liquid ingredient is sprayed into the mixer at a rate of about 0.2–1 parts by weight per minute.

6. An article of manufacture comprising the de-icing composition of claim 1.

7. The article of claim 6, wherein the article is adapted to spray the composition of claim 1.

* * * * *